United States Patent
Yamamoto

(10) Patent No.: US 8,366,194 B2
(45) Date of Patent: Feb. 5, 2013

(54) VEHICLE SEATS

(75) Inventor: Tomoaki Yamamoto, Tokyo (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 76 days.

(21) Appl. No.: 12/368,443

(22) Filed: Feb. 10, 2009

(65) Prior Publication Data
US 2009/0206643 A1 Aug. 20, 2009

(30) Foreign Application Priority Data
Feb. 18, 2008 (JP) ................................. 2008-035630

(51) Int. Cl.
*A47C 3/00* (2006.01)
(52) U.S. Cl. .............................. 297/284.11; 297/344.15
(58) Field of Classification Search ............. 297/284.11, 297/344.15, 344.17, 284.4
See application file for complete search history.

(56) References Cited

U.S. PATENT DOCUMENTS

| | | | | |
|---|---|---|---|---|
| 4,583,781 A | * | 4/1986 | Hatsutta et al. | 297/284.11 |
| 4,765,582 A | * | 8/1988 | Babbs | 248/394 |
| 4,767,156 A | * | 8/1988 | Yamada et al. | 297/313 |
| 4,993,678 A | * | 2/1991 | Easter | 248/371 |
| 5,908,220 A | * | 6/1999 | Bauer et al. | 297/284.1 |
| 6,290,198 B1 | * | 9/2001 | Kojima et al. | 248/422 |
| 6,435,610 B2 | * | 8/2002 | Kondo et al. | 297/284.11 |
| 6,921,058 B2 | * | 7/2005 | Becker et al. | 248/419 |
| 7,066,540 B2 | * | 6/2006 | Minai et al. | 297/344.15 |
| 7,404,602 B2 | * | 7/2008 | Okada et al. | 297/284.11 |
| 7,517,020 B2 | * | 4/2009 | Yokota | 297/344.15 |
| 8,132,658 B2 | * | 3/2012 | Kawai et al. | 192/223.2 |
| 8,177,280 B2 | * | 5/2012 | Yamada et al. | 296/65.05 |
| 2009/0218868 A1 | * | 9/2009 | Koga et al. | 297/344.17 |

FOREIGN PATENT DOCUMENTS

| | | | |
|---|---|---|---|
| DE | 4241183 A1 | * | 6/1994 |
| JP | 06001172 A | * | 1/1994 |
| JP | 2001-219767 | | 8/2001 |
| JP | 2001-301497 A | | 10/2001 |
| JP | 2009-120077 | | 6/2009 |
| JP | 2009189679 A | * | 8/2009 |

OTHER PUBLICATIONS

English Abstract and bibliographic data of JP06001172 A, JPO/Japio, Seat, Jan. 11, 1994, (one page).*
English language Abstract of JP 2001-301497 A (Oct. 31, 2001).
Japan Office action, dated Sep. 25, 2012 along with an english translation thereof.

* cited by examiner

*Primary Examiner* — David Dunn
*Assistant Examiner* — David E Allred
(74) *Attorney, Agent, or Firm* — Greenblum & Bernstein, P.L.C.

(57) ABSTRACT

A vehicle seat can include a seat cushion having a main portion and a tiltable portion, and a drive mechanism having a small gear and a large gear. The small and large gears are respectively attached to the main portion while meshing with each other. The tiltable portion is arranged and constructed to vertically move when the large gear is rotated upwardly and downwardly with respect to a rotationally reference position based on rotation of the small gear. The small gear and the large gear are positioned such that rotation centers thereof are vertically offset from each other.

3 Claims, 5 Drawing Sheets

VEHICLE SEATS

This application claims priority to Japanese patent application serial number 2008-035630, the contents of which are incorporated herein by reference.

BACKGROUND OF THE INVENTION

1. Field of the Invention

The present invention relates to vehicle seats. More particularly, the present invention relates to vehicle seats having front tilting mechanisms.

2. Description of Related Art

A vehicle seat having a front tilting mechanism is already known. The front tilting mechanism is capable of vertically moving a front portion (a tiltable portion or a movable portion) of a seat cushion which portion may function to support femoral portions of a passenger, so as to adjust a height of the seat cushion front portion based on a body type of the passenger. In the vehicle seat, the front tilting mechanism includes a power transmission device that is constructed of a gear train. That is, a main portion of the seat cushion is provided with a sector gear that is attached thereto. Conversely, the tiltable portion of the seat cushion is provided with a pinion gear that meshes with the sector gear. Thus, upon rotation of the pinion gear, the tiltable portion is capable of vertically moving with respect to the main portion. Such a vehicle seat is taught, for example, by Japanese Laid-Open Patent Publication Number 2001-301497.

However, the vehicle seat includes a pinion gear drive mechanism in order to drive or rotate the pinion gear. The pinion gear drive mechanism is attached to the tiltable portion. This may lead to increased weight of the tiltable portion.

BRIEF SUMMARY OF THE INVENTION

In one aspect of the present invention, a vehicle seat may include a seat cushion having a main portion and a tiltable portion, and a drive mechanism having a small gear and a large gear. The small and large gears are respectively attached to the main portion while meshing with each other. The tiltable portion is arranged and constructed to vertically move when the large gear is rotated upwardly and downwardly with respect to a rotational reference position based on rotation of the small gear. The small gear and the large gear are positioned such that rotation centers thereof are vertically offset from each other.

According to this aspect, because the rotation centers of the small and large gears are vertically offset from each other, when the large gear is rotated with respect to the rotational reference position, a vertical travel distance of the large gear is smaller than a vertical travel distance of the small gear in a case that the rotation center of the small gear is positioned on the same level as the rotation center of the large gear. That is, a vertical travel distance of the drive mechanism can be effectively reduced.

Optionally, the large gear may include a geared portion meshing with the small gear and a lever portion. Further, the lever portion extends in a direction opposite to the geared portion across the rotation center of the large gear and is coupled to the tiltable portion.

In addition, a rear end portion of the tiltable portion is rotatably connected to the main portion so that the tiltable portion can be moved vertically.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention will be described with reference FIGS. 1 to 6.

Figure 1:
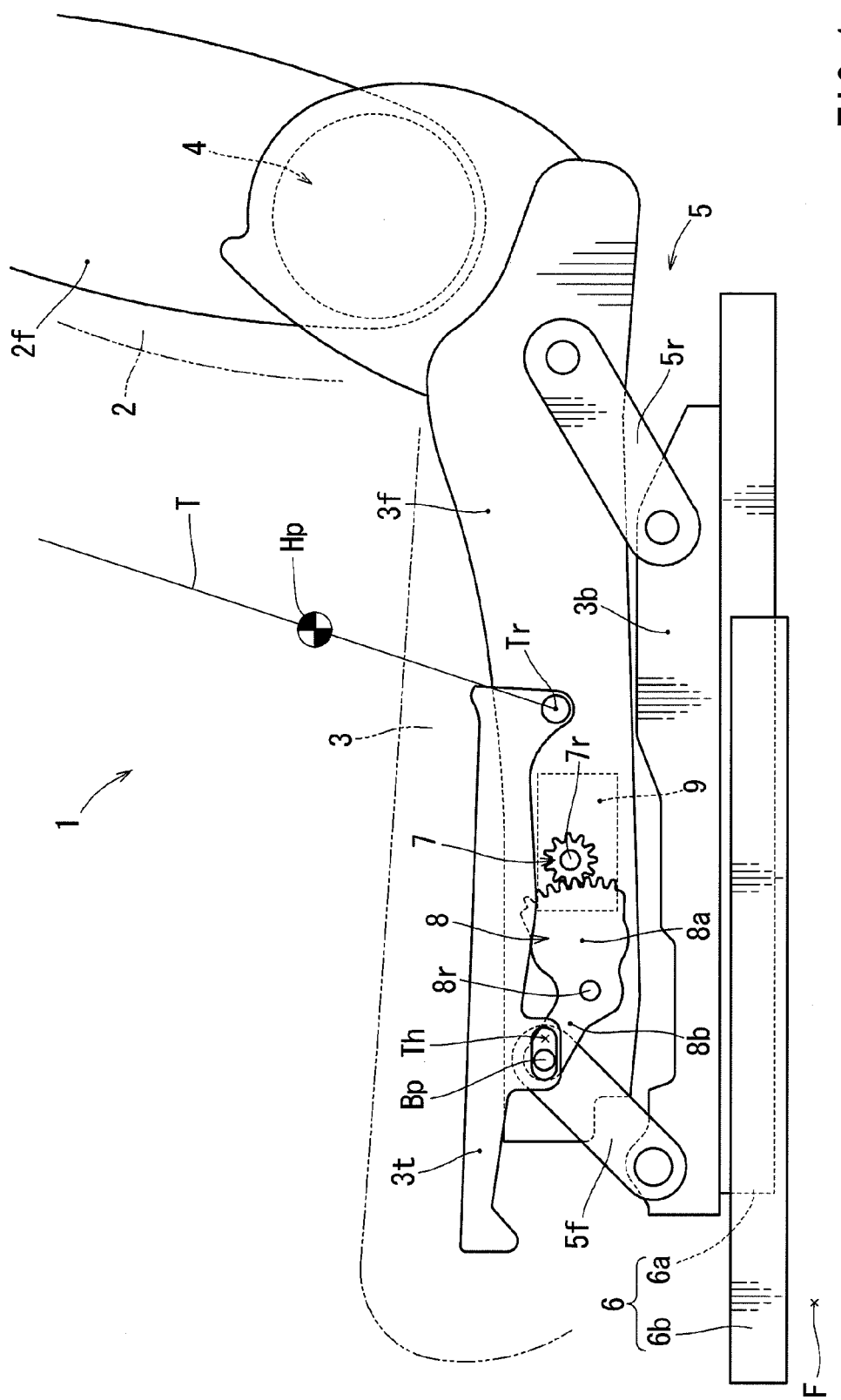
FIG. 1 is a partially side view of a vehicle seat according to a representative embodiment of the present invention.

As shown in FIG. 1, a vehicle seat (a driver seat) includes a seat main body 1 and a pair of slide rail assemblies 6 (one of which is shown). The seat main body 1 includes a seat back 2 having a seat back frame 2f and a seat cushion 3 having a seat cushion frame 3f (a main portion). Naturally, the seat main body 1 has a seat cushion pad, a seat cushion cover, a seat back pad and a seat back cover. However, the pads and the covers are omitted in the drawings for clarity.

The slide rail assemblies 6 are constructed of lower rails 6b (fixed members) and upper rails 6a (slide members). The lower rails 6b are disposed on a vehicle floor F so as to extend in a longitudinal direction of a vehicle. The lower rails 6b are positioned in parallel while being laterally spaced at a desired distance. Conversely, the upper rails 6a are respectively slidably coupled to the lower rails 6b so as to move back and forth therealong. Each of the upper rails 6a has a bracket 3b that is integrally disposed thereon.

The seat back frame 2f is rotatably connected to the seat cushion frame 3f via reclining mechanisms 4 (one of which is shown), so that the seat back 2 can be tilted back and forth of the vehicle. Conversely, the seat cushion frame 3f is connected to the brackets 3b of the upper rails 6a via vertically moving mechanisms 5 (one of which is shown), so that the seat cushion 3 (the seat main body 1) can move or slide back and forth along the slide rail assemblies 6 when the upper rails 6a are slid longitudinally along the lower rails 6b. Further, each of the vertically moving mechanisms 5 can include a front link arm 5f and a rear link arm 5r that are capable of forming a four-joints link mechanism. The seat cushion frame 3f is movably linked to the brackets 3b via the front and rear link arms 5f and 5r, so that the seat cushion 3 (the seat main body 1) can vertically move with respect to the brackets 3b.

Figure 3:
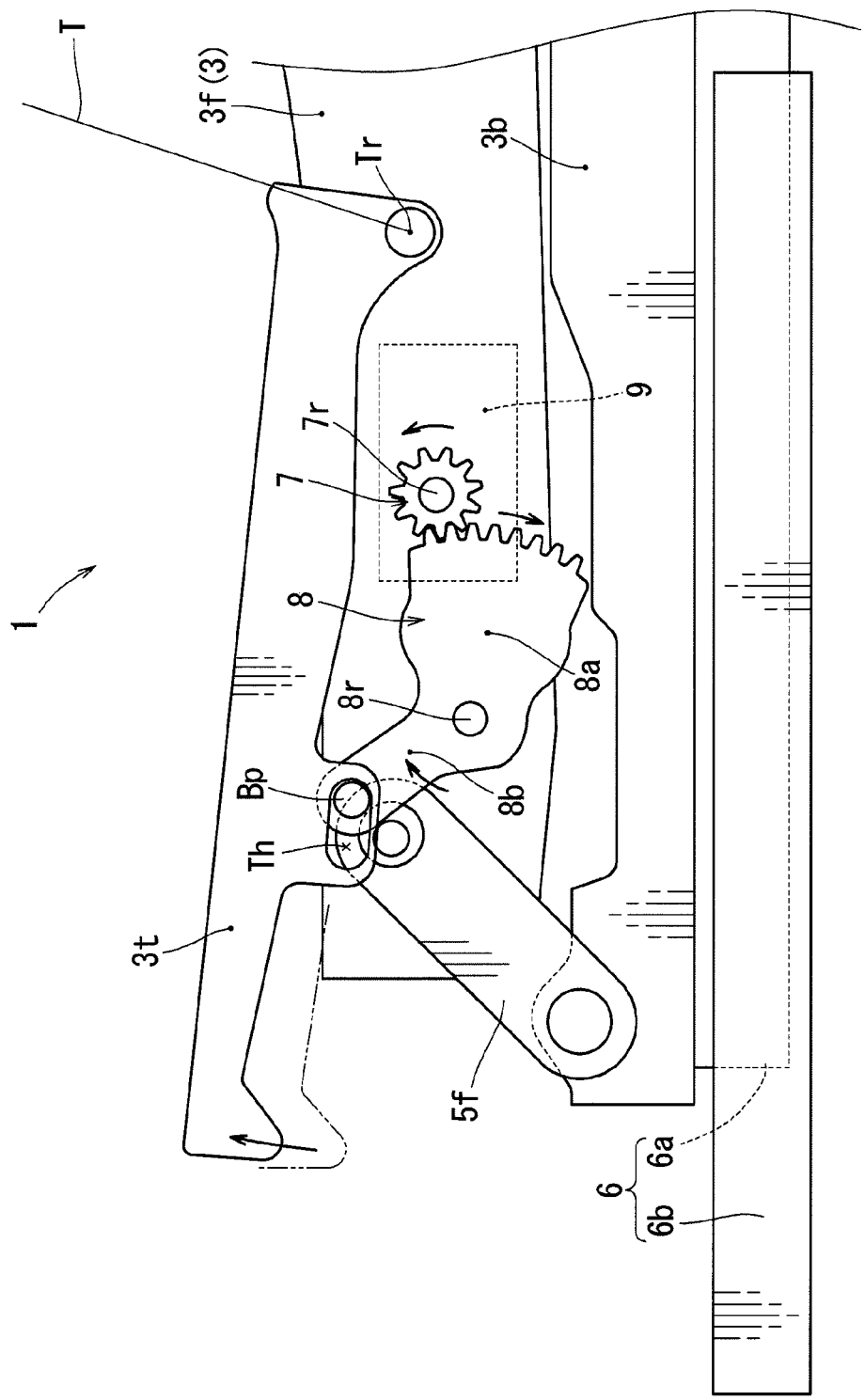
FIG. 3 is a partially enlarged view of FIG. 1, which illustrates a condition in which the tiltable panel is moved upwardly.
Figure 4:
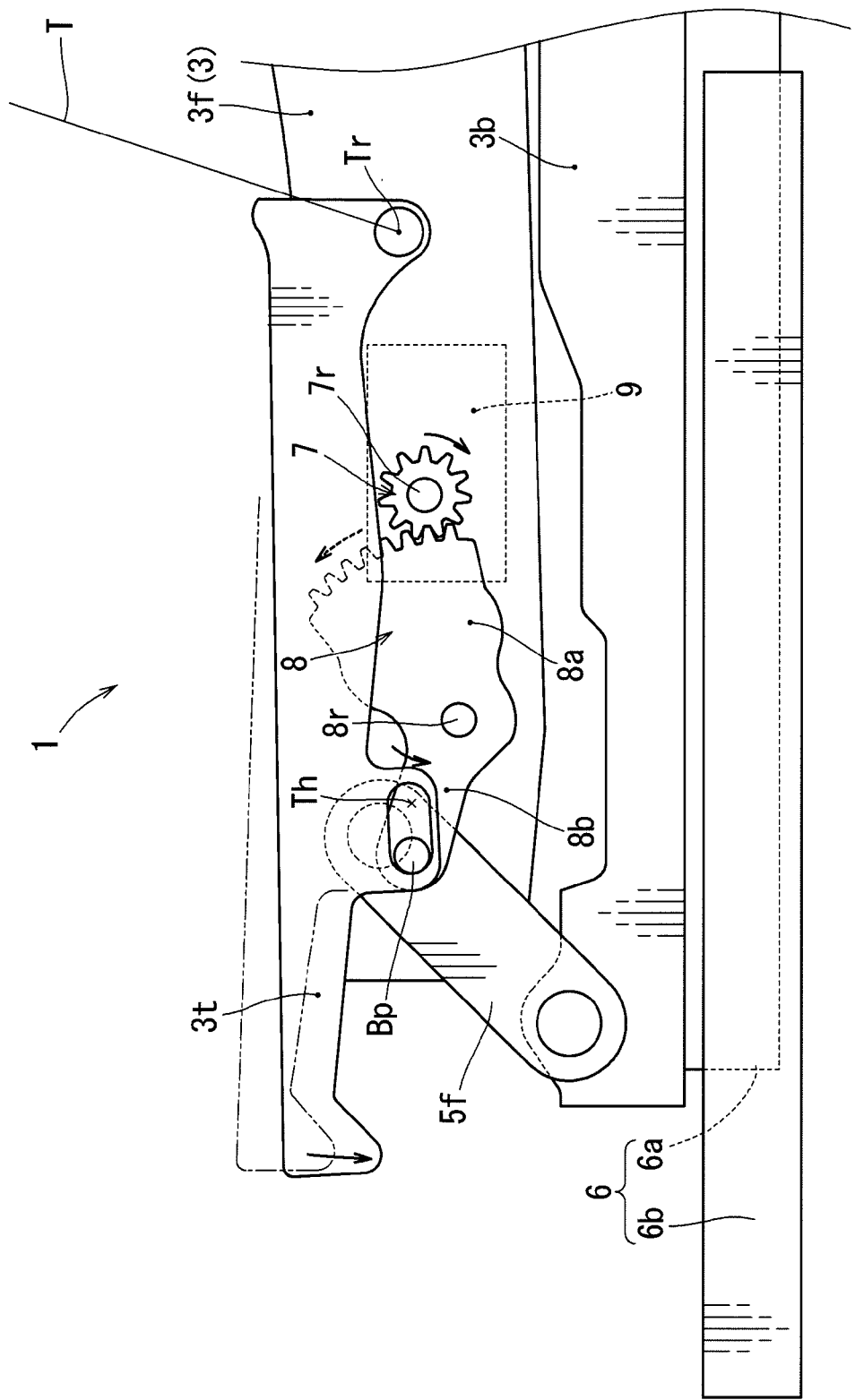
FIG. 4 is a partially enlarged view of FIG. 1, which illustrates a condition in which the tiltable panel is moved downwardly.
Figure 5:
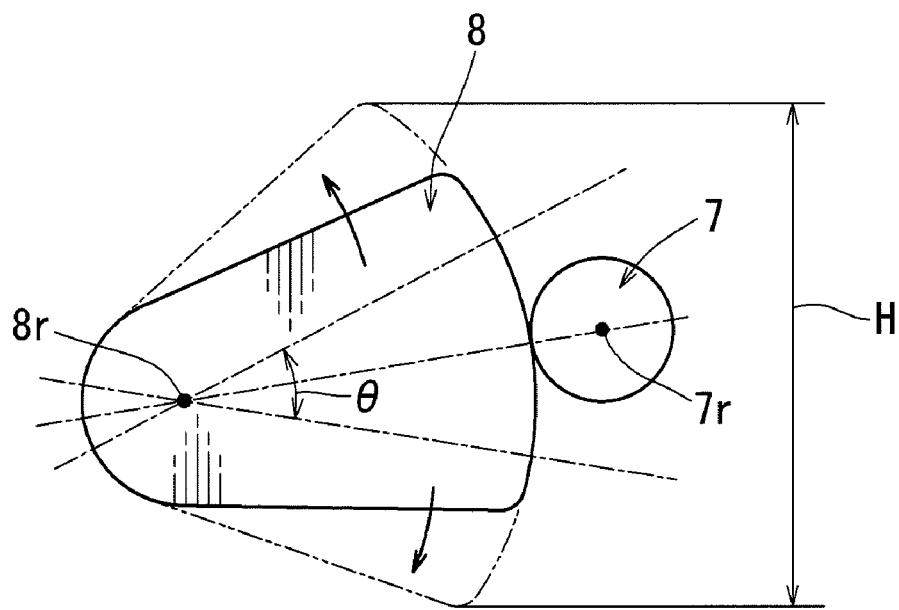
FIG. 5 is an explanatory view of a sector gear and a pinion gear, which illustrates a vertical travel distance of the sector gear.

The vehicle seat (the seat main body 1) includes a front tilting mechanism. That is, the seat cushion 3 may preferably include a tiltable panel 3t (a tiltable portion) that is positioned in a front end portion of the seat cushion 3. The tiltable panel 3t has a substantially flat upper surface so as to reliably support femoral portions of a passenger. Rear side end portions of the tiltable panel 3t are rotatably connected to the cushion frame 3f via a connector shaft Tr, so that the tiltable panel 3t can be moved or rotated vertically about the connector shaft Tr. Thus, upon rotation of the tiltable panel 3t, a height of the tiltable panel 3t relative to the cushion frame 3f can be changed (FIGS. 3 and 4).

The seat cushion 3 further includes a drive mechanism that is arranged and constructed to move or rotate the tiltable panel 3t about the connector shaft Tr. The drive mechanism is constructed from a pair of pinion gears 7 (one of which is shown), a pair of sector gears 8 (one of which is shown) and a drive motor 9. The pinion gears 7 (small gears) are rotatably connected to the cushion frame 3f via a transversely extending connector shaft 7r that is positioned in front of the connector shaft Tr. Further, the pinion gears 7 are respectively coupled to the drive motor 9 that is fixedly attached to the cushion frame 3f. That is, the pinion gears 7 can respectively be rotated by the drive motor 9.

Each of the sector gears 8 may preferably be formed in one piece. Each of the sector gears 8 has a geared portion 8a and a lever portion 8b. The sector gears 8 (large gears) are positioned in front of the pinion gears 7 (on the left of the pinion gears 7 in the drawings). The sector gears 8 are rotatably connected to the cushion frame 3f via a transversely extending connector shaft 8r while the geared portions 8a mesh with the pinion gears 7. Further, each of the sector gears 8 may preferably be formed such that the lever portion 8b extends in a direction opposite to the geared portion 8a across the connector shaft 8r. In addition, the lever portion 8b may preferably be shaped to be upwardly angled with respect to the geared portion 8a. Further, the connector shaft 8r may preferably be positioned in parallel with the connector shaft 7r.

The lever portions 8b of the sector gears 8 are respectively provided with connector pins Bp. The connector pins Bp are respectively slidably coupled to elongated slots Th that are formed in the tiltable panel 3t. The elongated slots Th may preferably be longitudinally horizontally extended along lower peripheries of the tiltable panel 3t so as to absorb longitudinal motion of the connector pins Bp when the sector gears 8 are rotated.

When the pinion gears 7 are rotated counterclockwise or clockwise by the drive motor 9, the sector gears 8 are rotated clockwise or counterclockwise with respect to a rotational reference (normal) position shown in FIG. 1 while the connector pins Bp slide within the elongated slots Th formed in the tiltable plate 3t. As a result, the tiltable plate 3t can be moved or rotated upwardly or downwardly within a predetermined rotational range between an uppermost position (FIG. 3) and a lowermost position (FIG. 4), so that the height of the tiltable plate 3t relative to the cushion frame 3f can be changed. Thus, a height of the front end portion of the seat cushion 3 can be adjusted for body size of the passenger.

Further, in this embodiment, the geared portion 8a of each of the sector gears 8 may preferably be formed to a cone shape, so that the tiltable plate 3t can restrictively be rotated only within the predetermined rotational range between the uppermost position and the lowermost position. In addition, the sector gears 8 may preferably be shaped so as to not interfere with the brackets 3b, the tiltable plate 3t and other components. Further, if it is structurally difficult to appropriately shape the sector gears 8 so as to not interfere with the brackets 3b, the bracket 3b can be partially removed or cut off, thereby avoiding the sector gears 8 from interfering with the bracket 3b.

Figure 2:
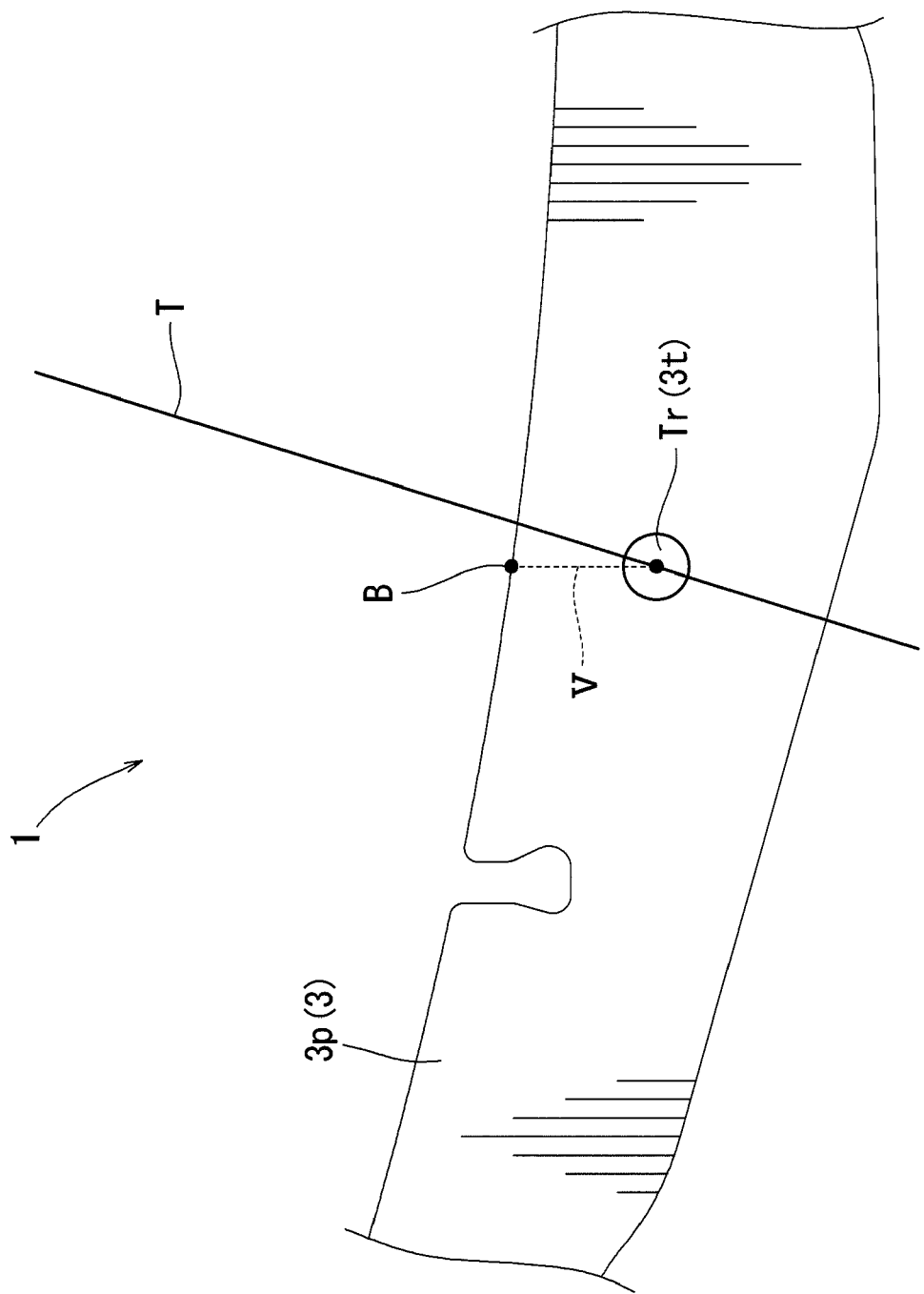
FIG. 2 is a partially enlarged side view of a tiltable panel, which illustrates a rotation center thereof.

Further, as shown in FIG. 1, the connector shaft Tr (a rotation center of the tiltable panel 3t) may preferably be positioned so as to be opposite to the connector shaft 8r of the sector gears 8 across the connector shaft 7r of the pinion gears 7. In other words, the connector shaft Tr may preferably be positioned so as to be spaced from the lever portion 8b of the sector gears 8 beyond the connector shaft 7r of the pinion gears 7. In particular, the connector shaft Tr can be positioned on a torso line T corresponding to a line (a body-center line) that passes through a hip point Hp of the passenger sitting on the vehicle seat. Also, as shown in FIG. 2, the connector shaft Tr is positioned on a vertical line V that passes through an ischial bone point B of the seat cushion pad 3p of the seat cushion 3. In this embodiment, the ischial bone point B is defined as a portion in which an ischial bone of the passenger contacts the seat cushion pad 3p. That is, the connector shaft Tr is positioned on an intersection of the vertical line V and the torso line T.

Generally, the ischial bone point B of the seat cushion pad 3p can be applied with a maximum pressure when the passenger sits the vehicle seat. That is, in this embodiment, the connector shaft Tr (the rotation center of the tiltable panel 3t) is positioned directly beneath the ischial bone point B that can be applied with the maximum pressure by the passenger sitting on the vehicle seat. Therefore, when the tiltable panel 3t is rotated, portions of the seat cushion pad 3p other than the ischial bone point B is not applied with a pressure greater than the maximum pressure applied to the ischial bone point B. As a result, when the tiltable panel 3t is rotated, the seat cushion cover (not shown) of the seat cushion 3 can be prevented from wrinkling.

Further, the connector shaft Tr (the rotation center of the tiltable panel 3t) thus positioned substantially corresponds to bases of the femoral portions of the passenger sitting on the vehicle seat. Therefore, when the tiltable panel 3t is rotated, the femoral portions of the passenger can be rotated with rotational motion of the tiltable panel 3t. As a result, the tiltable panel 3t can be easily and smoothly rotated. Further, when the tiltable panel 3t is rotated, the femoral portions of the passenger can be rotated while the femoral portions are maintained in substantially parallel with the tiltable panel 3t. That is, when the tiltable panel 3t is rotated, an angle between the tiltable panel 3t and the femoral portions of the passenger is maintained substantially constant. As a result, the femoral portions of the passenger can always be stably supported by the supper upper surface of the tiltable panel 3t.

Figure 6:
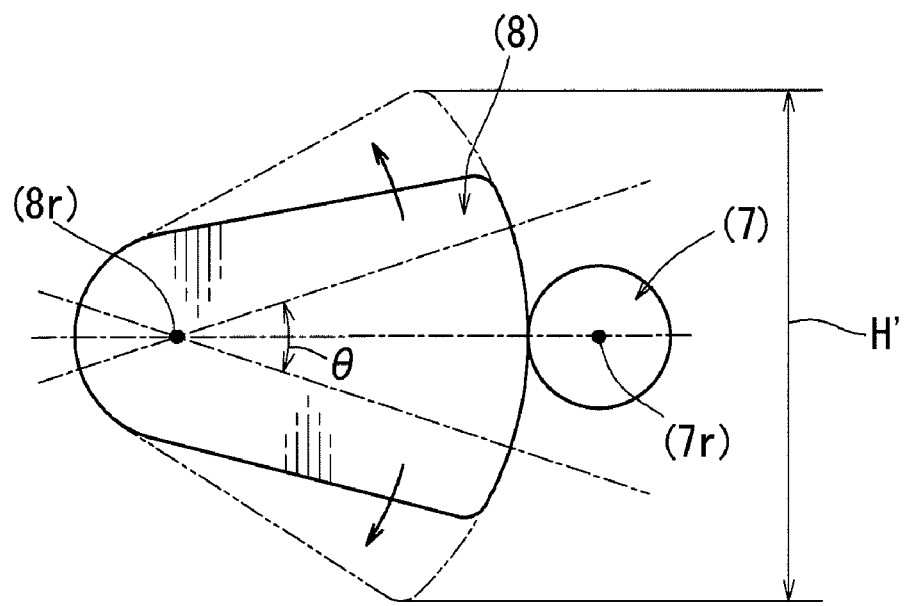
FIG. 6 is a similar view of FIG. 5, in which a rotation center of the sector gear is positioned on the same level as a rotation center of the pinion gear.

In addition, as shown in FIGS. 1 and 3-5, in this embodiment, a rotation center (the connector shaft 7r) of the pinion gears 7 and a rotation center (the connector shaft 8r) of the sector gears 8 may preferably be vertically offset from each other. In particular, the connector shaft 7r of the pinion gears 7 is positioned on a level higher than the connector shaft 8r of the sector gears 8. Therefore, when the sector gears 8 are rotated clockwise and counterclockwise over a certain angle θ with respect to the normal position shown in FIG. 1, a vertical travel distance H of the sector gears 8 (the geared portions 8a) is smaller than a vertical travel distance H' of the sector gears 8 in a case that the rotation center (the connector shaft 7r) of the pinion gears 7 is positioned on the same level as the rotation center (the connector shaft 8r) of the sector gears 8 (FIG. 6).

Further, as previously described, the sector gears 8 is connected to the tiltable panel 3t via the lever portions 8b that extend in a direction opposite to the geared portion 8a of the sector gears 8. Therefore, even if the vertical travel distance H of the sector gears 8 (the geared portions 8a) is reduced, the tiltable panel 3t can be moved upwardly or downwardly over a wide rotational range.

Various changes and modifications may be made to the present invention without departing from the scope of the previously shown and described embodiment. For example, as described above, the tiltable panel 3t is coupled to the lever portions 8b of the sector gears 8 via connector pins Bp and the elongated slots Th. However, the tiltable panel 3t can be coupled to the lever portions 8b of the sector gears 8 via other link mechanisms provided that the link mechanisms is capable of absorbing the longitudinal motion of the connector pins Bp when the sector gears 8 are rotated.

What is claimed is:

1. A vehicle seat comprising:
   a seat cushion having a main portion and a tiltable portion; and
   a drive mechanism having a small gear and a large gear,
   wherein the tiltable portion is disposed within the seat cushion and rotatably connected to the main portion,
   wherein the small and large gears are respectively rotatably attached at the main portion while meshing with each other,
   wherein the tiltable portion is arranged and constructed to vertically move when the large gear is rotated upwardly and downwardly with respect to a rotational reference position based on rotation of the small gear,
   wherein the small gear and the large gear are positioned such that rotation centers thereof are vertically offset from each other,
   wherein the large gear includes a geared portion meshing with the small gear and a lever portion,
   wherein the lever portion extends in a direction opposite to the geared portion across the rotation center of the large gear and is coupled to the tiltable portion, and
   wherein the tiltable portion includes an elongated slot that operatively couples the lever portion of the large gear to the tiltable portion.

2. The vehicle seat as defined in claim 1, wherein a rear end portion of the tiltable portion is rotatably connected to the main portion so that the tiltable portion can be moved vertically, and wherein a rotation center of the tiltable portion is positioned so as to be spaced from the lever portion of the large gear beyond the rotation center of the small gear.

3. The vehicle seat as defined in claim 1, wherein a rear end portion of the tiltable portion is rotatably connected to the main portion so that the tiltable portion can be moved vertically, and wherein a rotation center of the tiltable portion is positioned at the rear end portion thereof and configured to generally align with a body-center line of a passenger sitting on the vehicle seat.

\* \* \* \* \*